United States Patent [19]

Larsen

[11] Patent Number: 4,620,730

[45] Date of Patent: Nov. 4, 1986

[54] COUPLING DEVICE FOR PIPELINES

[76] Inventor: Uffe M. Larsen, Søborg Hovedgade 74, 2860 Søborg, Denmark

[21] Appl. No.: 712,034

[22] Filed: Mar. 15, 1985

[30] Foreign Application Priority Data

Aug. 20, 1984 [DK] Denmark .............................. 3982/84

[51] Int. Cl.$^4$ .......................................... F16L 27/04
[52] U.S. Cl. .................................... 285/166; 285/177; 285/235; 285/268; 285/906
[58] Field of Search .............. 285/166, 167, 268, 269, 285/270, 271, 177, 235, 906

[56] References Cited

U.S. PATENT DOCUMENTS

| 1,690,839 | 11/1928 | Roth | 285/271 X |
| 2,456,182 | 12/1946 | Goble | 285/269 X |
| 2,793,883 | 5/1957 | Main | 285/235 X |
| 3,144,263 | 8/1964 | Gray | 285/269 |

FOREIGN PATENT DOCUMENTS

| 884137 | 7/1953 | Fed. Rep. of Germany . | |
| 377209 | 1/1907 | France | 285/166 |
| 30283 | 1/1920 | Norway . | |
| 19138 | 3/1903 | Sweden . | |
| 143998 | 2/1954 | Sweden . | |
| 629084 | 9/1949 | United Kingdom | 285/269 |

Primary Examiner—Dave W. Arola
Attorney, Agent, or Firm—Stevens, Davis, Miller & Mosher

[57] ABSTRACT

A coupling device for pipelines, such as offshore oil or gas lines, comprises a casing having at least one opening for the introduction of the end of a pipe section and an internal frusto-conical wall surface around said opening and diverging away therefrom, said surface constituting a seat for a spherical member firmly connected with a pipe section, said spherical member being at its opposite side influenced by a pressure member, for instance a frusto-conical member biased by a pressure member to firmly engage said frusto-conical surface while allowing said spherical member to turn relative to said frusto-conical wall surface.

The casing may be a two-part casing having two opposite aligned openings for the introduction of pipe sections and frusto-conical wall surfaces diverging towards each other, each of said wall surfaces forming the seat for the respective spherical member with its associated pressure member.

5 Claims, 2 Drawing Figures

U.S. Patent    Nov. 4, 1986    4,620,730
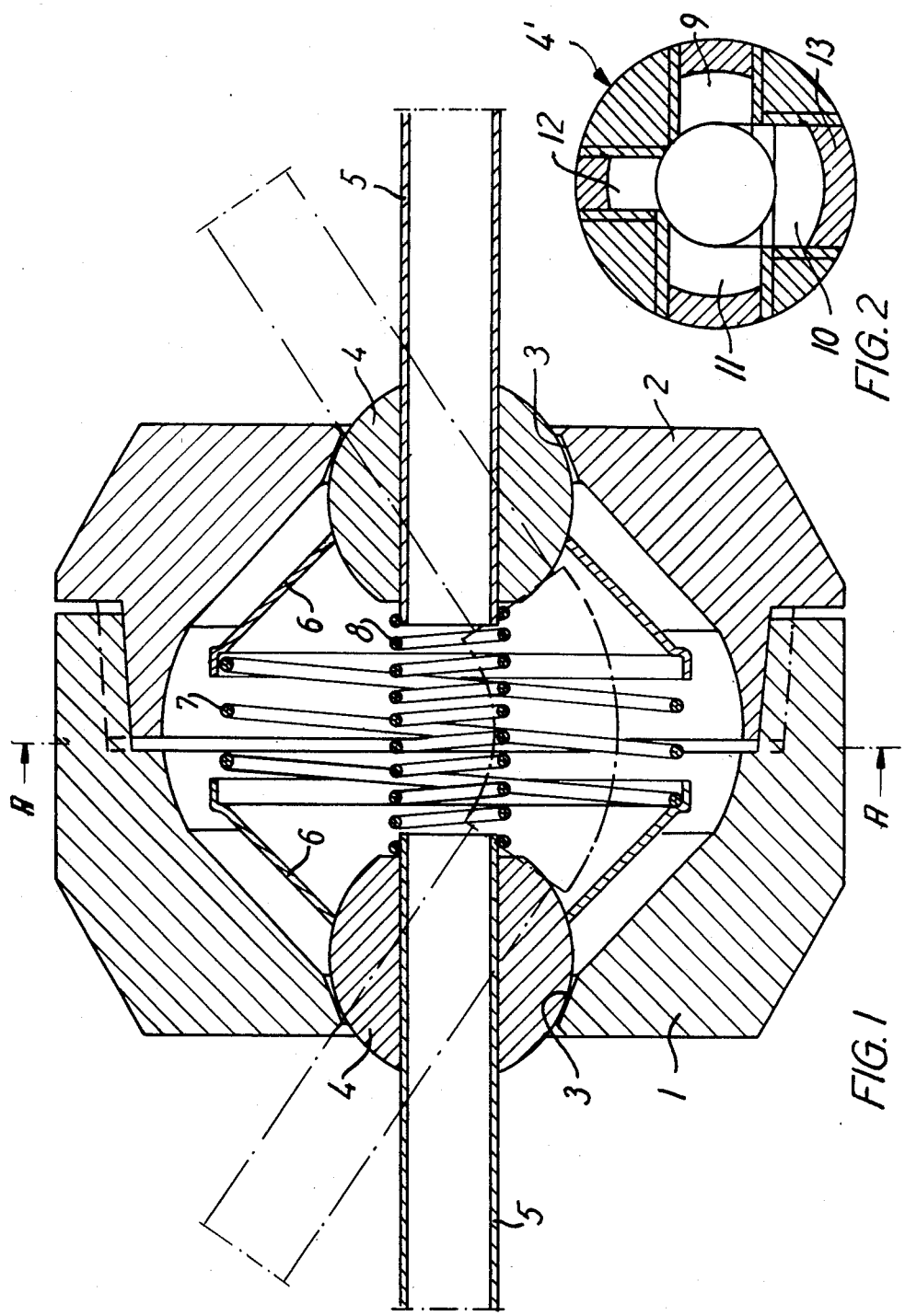

COUPLING DEVICE FOR PIPELINES

The invention relates to a coupling device for pipelines, such as off-shore oil or gas lines, comprising a casing, with which a pipe section may be connected with a varying angular orientation relative to the casing.

BACKGROUND OF THE INVENTION

In hydraulic systems in which the use of flexible tubes or hoses is disadvantageous or impossible, e.g. as a result of a high internal pressure in the pipe system, it is known to provide a flexible connection between rigid pipe sections by means of a coupling device comprising a spherical member connected with one pipe section and supported in a spherical bearing in a housing connected with the other pipe section, the spherical member further comprising a duct forming a connection between the pipe sections. In order to maintain the movability of the coupling device, the high pressure pipe section is connected through the duct in the spherical member with chambers on opposite sides of the spherical member having a form so as to equalize the pressures on both sides of the spherical member.

SUMMARY OF THE INVENTION

It is an object of the invention to provide a coupling device for connection of two rigid pipe sections under an arbitrary angle within a considerable angular range and to provide a design which in principle may be used within a large range of pipe diameters and thus within a number of different fields of applications ranging from domestic plumbing systems to large pipeline systems.

Particularly in connection with off-shore pipelines for oil and gas, in which the individual pipe sections are presently joined by welding or bolting with resulting very high production costs and very limited freedom in the positioning of pipes, it is a further object of the invention to provide a considerably improved flexibility allowing movability in the joints between the pipe sections.

According to the invention there is provided a coupling device comprising a casing having at least one opening for introducing the end of a pipe section, said opening being surrounded towards the interior of the casing by a frusto-conical wall surface diverging towards the interior of the casing, a substantially spherical member adapted for rigid connection with said end of the pipe section being arranged in said casing to engage said frusto-conical wall surface, and a pressure member biased to force said spherical member into firm engagement with said frusto-conical wall surface while allowing said spherical member to turn relative to said frusto-conical wall surface, thus permitting a variation of the angular orientation of said pipe section relative to said casing.

Compared to a coupling device in which the turnable member forms only a part of a sphere, the maximum angle which the pipe section may form with the casing will be considerably greater. The frusto-conical wall surfaces in the casing of the coupling device according to the invention are essentially less expensive to produce than a spherical surface which must fit a second spherical surface. Moreover, the frusto-conical wall surface will allow the use in one and the same casing of spherical members of different diameters. As a result thereof the precision required in manufacturing the spherical member may be reduced, on one hand, and, on the other hand, it will be sufficient to keep a smaller number of the most expensive component of the coupling device, i.e. the casing, in stock and still be able to carry out replacement or modification operations on existing pipe systems comprising spherical members of different diameters.

As a further advantage, the coupling device according to the invention may be kept sealed against penetration into it of liquid from the exterior, irrespective of the pressure in the pipeline, in which the coupling device is fitted. This is of particular importance for off-shore lines which, e.g. during repair works, are without any internal pressure and are thus exposed to the very considerable pressure from the surrounding sea water.

In an embodiment of the coupling device according to the invention the pressure member is a frusto-conical shell member arranged coaxially with said frusto-conical wall surface, the end of said pressure member having the smallest diameter engaging said spherical member and the opposite end of said pressure member being engaged by a compression spring.

As a result thereof the coupling device will operate independently of any application of external forces which is a considerable advantage for off-shore pipelines and may also be economically desirable for small sizes of the coupling device to be used on-shore, for instance in the petro-chemical industry.

As an additional possibility, the load pressing the spherical member against its seat may be provided by piston/cylinder mechanisms exposed to pressure from the outside by a separate unit providing a fluid pressure, thereby allowing control of the pressure, so that the engagement pressure against the seat may be kept constant at varying pressure differences between the inside and the outside of the casing.

In a preferred embodiment of the invention the casing comprises two interconnected parts having substantially aligned openings for the introduction of pipe sections, said openings being surrounded by coaxial frusto-conical wall surfaces diverging towards each other, spherical members adapted for rigid connection with each of said pipe sections and pressure members associated individually with each of said spherical members to cause said members to engage each of this frusto-conical wall surfaces. A coupling device of said type will constitute a most appropriate fitting for installation in a submerged pipeline, allowing the line to be constructed with high flexibility, thereby further ensuring that the pipeline will not leak or crack due to deformations caused by settling of the sea bed or external forces such as current pressure acting on the pipes.

The separation surface dividing the casing of the coupling device may extend substantially in a radial or an axial plane depending on the size and the application of the coupling device. The spherical member may further comprise a number of aligned openings for the introduction of pipe sections of different dimensions.

With a view to passing a "pig" or a cleaning brush through the coupling device when installed in an oil or gas pipeline or in a system with smaller pipe dimensions, respectively, the protruding pipe ends on the opposing sides of the spherical members are connected by a flexible element, for instance a helical spring or leaf spring members, which guides the pig on its way from one pipe section to the next.

The coupling device is in particular well suited for use in submerged oil or gas lines at production platforms where the pipeline may become misaligned owing to settling of the sea bed, on one hand, and is exposed on the other hand to heavy external deflecting forces originating from wave and current action and giving rise to stress causing cracks or bursting of the pipeline which will often have serious consequences such as large leaks of hydrocarbons, resulting in production losses and destruction of the marine environment. By placing coupling devices according to the invention in appropriate locations in a submerged pipeline system the risk of such leakages and pipe bursts occurring is avoided.

In some oil and gas fields use is made of mobile drilling platforms which are released and removed from the site in case of an approaching hurricane or a collision risk caused by drifting ice. When the danger is over and the pipeline connection is to be re-established it is difficult to position the platform exactly in the previous location and incorporation of the coupling device according to the invention in the pipe system will then ensure that any displacement of the pipe sections to be connected is easily overcome due to the flexibility of the coupling device.

When a pipeline section is to be repaired a temporary by-pass is often established at the site of the repair in order to keep the pipeline operating. Using the coupling device according to the invention the by-pass pipeline can easily be constructed with due consideration of the local sea bed conditions and without the usual limitations imposed by application of standard pipe fittings, such as 45° or 90° welded bends.

The invention will be explained in detail in the following with reference to the schematical drawings, in which FIG. 1 is a cross-section of a coupling device according to the invention in an embodiment with two spherical members, and FIG. 2 is a cross-section of a spherical member according to the invention with various openings for the introduction of pipe sections.

The casing illustrated in FIG. 1 is in two parts and each casing part 1, 2 comprises an opening for the introduction of a pipe section which opening adjoins an internal frusto-conical wall surface forming a seat for a spherical member 4 firmly mounted on the pipe section 5. The casing is divided along a plane indicated in the drawings by a line A—A, perpendicular to the common axis of the two frusto-conical wall surfaces 3. Each spherical member 4 is engaged by a pressure member 6 which, in the illustrated embodiment, is a shell-formed frusto-conical member disposed co-axially with the wall surface 3 and with its small end edge resting on the spherical member 4 while the edge of its base is engaged by a helical compression spring 7 so that the member 6 transfers the spring load from the compression spring 7 to the spherical member 4, thereby pressing it into close contact with the wall surface 3. The internal ends of the pipes 5 are connected by a soft helical spring 8 serving as a guide for a "pig" or a cleaning brush during its passing through the coupling device 4.

In the illustrated embodiment in which the coupling device is formed by two parts and have two opposed diverging co-axial frusto-conical wall surfaces 3 forming seats for the spherical members 4 which are firmly attached to respective ones of the pipe sections 5 to be connected, the included angle of the frusto-conical wall surfaces have an apex of 90°, which is advantageous for reasons of loadng and in respect of the angular adjusting range. Dot and dash lines in the figure indicate a maximum angular motion of about 35° of each of the pipe sections 5 relative to the common axis of the casing parts 1 and 2.

As mentioned, the co-operation according to the invention between the spherical member and a conical abutment surface opens the possibility of using spherical members of different diameters in one and the same casing for the coupling device, whereby the pressure element 6, being spring-loaded in the illustrated embodiment provides a firm engagement between each spherical member 4 and the associated frusto-conical wall surface 3 within a certain diameter range of the spherical member. Thus, the same coupling device may then also be used within a certain range of different pipeline diameters.

Particularly with respect to the use of the coupling device for connecting submerged oil or gas pipelines it is an important feature of the invention that each spherical member 4 is loaded by the pressure member 6 with a force sufficient to counteract the external pressure on the coupling device.

In the illustrated embodiment the two casing parts 1 and 2 may be clamped together at the dividing face A—A by means known per se, e.g., of bolted connections or, particularly in case of smaller dimensions, a bayonet fit or a threaded joint may be used between said two casing parts.

Instead of the illustrated dividing face A—A extending in a radial plane a two-piece casing for the coupling device may also be provided with a dividing face extending substantially along an axial plane which with respect to the embodiment in FIG. 1 corresponds to a situation in which the figure shows one of the two casing parts of the coupling device, the dividing face A—A being removed. Such an embodiment will allow hinge connection of the two casing parts at the one side and locking them together by means of an appropriate locking device, for instance with snap-lock action, at the opposite side.

Appropriate sealing members may be inserted in a manner not shown at the dividing face between the two casing parts whether this dividing face extends along a radial plane or an axial plane.

Instead of the illustrated embodiment comprising a spring loaded pressure member in the form of a frusto-conical member, pressure members of a different design may be used, for instance a hollow pistonlike pressure member. Moreover, the pressure load may be provided in another way than by spring loading, for instance by means of a piston/cylinder mechanism which is exposed to exterior pressure by a separate unit providing a fluid pressure.

The embodiment illustrate in FIG. 1 constitutes an independent coupling device for interconnecting two pipe sections. The coupling device may, however, also be designed for connecting one pipe section with a different component, for instance a valve in a pipeline system, and may then be provided with a single spherical member with an associated frusto-conical abutment surface and a pressure member, all similar to the parts situated on one side of the dividing face A—A of the embodiment illustrated in FIG. 1.

FIG. 2 of the drawing shows a modification of the spherical member 4' with openings for introduction of pipe sections 9 to 12 of different diameters. When using such a spherical member two opposed insertion openings are used to form a flow channel for connection with one of the pipeline sections, on one hand, on the other hand, with a short internal pipe section which is connected with a similar internal pipe section at the other spherical member by means of a flexible guiding member, e.g. a member corresponding to the helical compression spring 8 in the embodiment in FIG. 1. The two remaining openings for the introduction of pipe sections are sealingly closed, for instance as shown at 13 by screw plugs with a spherical outer surface flush with the surface of the spherical member.

I claim:

1. A coupling device for pipelines, such as off-shore oil or gas lines, comprising a casing having at least one opening for introducing the end of a pipe section, said opening being surrounded towards the interior of the casing by a frusto-conical wall surface diverging towards the interior of the casing, a substantially spherical member adapted for rigid connection with said end of the pipe section positioned in said casing to engage said frusto-conical wall surface; a pressure member having an end engaging said spherical member and facing towards said frusto-conical wall surface and biasing said spherical member into firm engagement with said frusto-conical wall surface while allowing said spherical member to turn relative to said frusto-conical wall surface thus permitting a variation of the angular orientation of said pipe section relative to said casing; said pressure member and means for biasing said pressure members toward and against said spherical members being of frusto-conical shape and arranged coaxially with said frusto-conical wall surface, the end of said pressure member which engages said spherical member being the smallest diameter thereof; the casing comprising two interconnected parts having substantially aligned openings each being surrounded by coaxial frusto-conical wall surfaces diverging towards each other, spherical members arranged in each end of said casing and adapted for rigid connection with each of said pipe sections, and a said pressure member associated with both of said spherical members to cause said spherical members to engage their respective frusto-conical wall surfaces; said spherical members and said frusto-conical wall surfaces being proportioned to allow an angular turning of each of said pipe section through at least 35° in any direction relative to the common axis of the frusto-conical wall surfaces independently of the other pipe section.

2. A coupling device as claimed in claim 1, wherein said pipe sections have free ends projecting from the sides of said spherical members facing each other and are connected through flexible guiding means.

3. A coupling device as claimed in claim 1, wherein said two parts of the casing are joined along a dividing face extending substantially at right angles to the common axis of said frusto-conical wall surfaces.

4. A coupling device as claimed in claim 1, wherein said two parts of the housing are joined along a dividing face extending substantially in a plane comprising the common axis of said frusto-conical wall surfaces.

5. A coupling device as claimed in claim 1, comprising at least one said spherical member having openings for the introduction of pipe sections of varying diameters.

* * * * *